US008213748B2

(12) United States Patent
Kimura et al.

(10) Patent No.: US 8,213,748 B2
(45) Date of Patent: Jul. 3, 2012

(54) GENERATING AN ELECTRONIC DOCUMENT WITH REFERENCE TO ALLOCATED FONT CORRESPONDING TO CHARACTER IDENTIFIER FROM AN IMAGE

(75) Inventors: Shunichi Kimura, Kanagawa (JP); Masanori Sekino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 818 days.

(21) Appl. No.: 12/196,661

(22) Filed: Aug. 22, 2008

(65) Prior Publication Data

US 2009/0214115 A1    Aug. 27, 2009

(30) Foreign Application Priority Data

Feb. 26, 2008    (JP) .................................. 2008-044172

(51) Int. Cl.
*G06K 9/54* (2006.01)
(52) U.S. Cl. ....................................... 382/302
(58) Field of Classification Search .................... 382/302
See application file for complete search history.

(56) References Cited

U.S. PATENT DOCUMENTS

| | | | |
|---|---|---|---|
| 6,324,305 | B1 | 11/2001 | Holladay et al. |
| 6,937,762 | B2 | 8/2005 | Fujiwara |
| 6,978,046 | B2 | 12/2005 | Robinson et al. |
| 7,386,166 | B2 | 6/2008 | Curry et al. |
| 7,391,535 | B2 | 6/2008 | Jacobsen |
| 2002/0015524 | A1 | 2/2002 | Fujiwara |
| 2003/0084008 | A1* | 5/2003 | Simpson et al. ............... 705/408 |
| 2004/0260535 | A1* | 12/2004 | Chen et al. ........................ 704/9 |
| 2005/0105799 | A1* | 5/2005 | Strohecker et al. ........... 382/186 |
| 2005/0140679 | A1* | 6/2005 | Kaneda .......................... 345/441 |
| 2005/0166137 | A1* | 7/2005 | Tran ............................ 715/501.1 |
| 2005/0210009 | A1* | 9/2005 | Tran ................................... 707/3 |
| 2005/0270553 | A1* | 12/2005 | Kawara .......................... 358/1.13 |
| 2005/0286805 | A1* | 12/2005 | Yoshida ........................ 382/305 |
| 2006/0044605 | A1* | 3/2006 | Schneider et al. ........... 358/1.15 |
| 2006/0045386 | A1 | 3/2006 | Fukuoka et al. |
| 2007/0002388 | A1* | 1/2007 | Henry et al. .................. 358/400 |

(Continued)

FOREIGN PATENT DOCUMENTS

EP    1 494 455 A2    1/2005

(Continued)

OTHER PUBLICATIONS

Minami, *Image Engineering*, First Edition, Corona-sha, 1989, pp. 96-103.

(Continued)

*Primary Examiner* — David Zarka
(74) *Attorney, Agent, or Firm* — Oliff & Berridge, PLC

(57) ABSTRACT

An image processing apparatus includes: an image acceptance unit that accepts an image; a character information adding unit that adds a character identifier for uniquely identifying a character, a character position indicating a position of the character in the image, a character size indicating a size of the character, and a character color indicating a color of the character as character information, to the image accepted by the image acceptance unit; a font allocation unit that allocates a font without drawing element as a font corresponding to the character identifier within the character information added by the character information adding unit; and an electronic document generation unit that generates an electronic document for reference to the font information allocated by the font allocation unit, based on the character information added to the image by the character information adding unit.

7 Claims, 8 Drawing Sheets

U.S. PATENT DOCUMENTS

| | | | |
|---|---|---|---|
| 2007/0009161 A1* | 1/2007 | Hollingsworth | 382/229 |
| 2007/0180471 A1* | 8/2007 | Unz | 725/52 |
| 2007/0192687 A1* | 8/2007 | Simard et al. | 715/523 |
| 2007/0208719 A1* | 9/2007 | Tran | 707/3 |

FOREIGN PATENT DOCUMENTS

| | | |
|---|---|---|
| JP | A 53-10930 | 1/1978 |
| JP | A 53-49917 | 5/1978 |
| JP | A 57-189277 | 11/1982 |
| JP | A 5-28301 | 2/1993 |
| JP | A 5-120481 | 5/1993 |
| JP | A 5-143776 | 6/1993 |
| JP | A 5-174185 | 7/1993 |
| JP | A 6-44406 | 2/1994 |
| JP | A 6-187489 | 7/1994 |
| JP | A 6-348911 | 12/1994 |
| JP | A 7-13994 | 1/1995 |
| JP | A 7-160810 | 6/1995 |
| JP | A 8-161432 | 6/1996 |
| JP | A 8-297718 | 11/1996 |
| JP | A 10-69524 | 3/1998 |
| JP | A 10-134145 | 5/1998 |
| JP | A 10-261047 | 9/1998 |
| JP | A 2000-57261 | 2/2000 |
| JP | A 2000-196893 | 7/2000 |
| JP | A 2001-43314 | 2/2001 |
| JP | A 2003-085164 | 3/2003 |
| JP | A 2004-78531 | 3/2004 |
| JP | A 2005-039771 | 2/2005 |
| JP | A 2005-63445 | 3/2005 |
| JP | A 2005-175641 | 6/2005 |
| JP | A 2005-184402 | 7/2005 |
| JP | A 2005-184404 | 7/2005 |
| JP | A 2005-228331 | 8/2005 |
| JP | A 2006-253892 | 9/2006 |
| JP | A-2006-309443 | 11/2006 |

OTHER PUBLICATIONS

Japanese Office Action issued in Japanese Patent Application No. 2008-044172 on Jan. 26, 2010 (with translation).

Australian Office Action issued in Australian Patent Application No. 2008212078 on Feb. 3, 2010.

* cited by examiner

GENERATING AN ELECTRONIC DOCUMENT WITH REFERENCE TO ALLOCATED FONT CORRESPONDING TO CHARACTER IDENTIFIER FROM AN IMAGE

CROSS-REFERENCE TO RELATED APPLICATIONS

This application is based on and claims priority under 35 U.S.C. 119 from Japanese Patent Application No. 2008-044172 filed Feb. 26, 2008.

BACKGROUND

1. Technical Field

The present invention relates to an image processing apparatus and a computer readable medium.

2. Related Art

There is a document format for an electronic document suitable for displaying print image such as a portable document format (PDF: Portable Document Format (registered trademark)).

A process for converting a document created by the application software for a word processor or the like into such an electronic document that is then circulated by mail or printed is often performed.

In the electronic document, text information within the document can be copied and pasted to another application file. For example, a document with the same contents as the document within the electronic document can be used on the word processor by copying (duplicating) a character code of text information within the electronic document in a PDF format and pasting it to a file on the word processor.

SUMMARY

According to an aspect of the present invention, an image processing apparatus includes: an image acceptance unit that accepts an image; a character information adding unit that adds a character identifier for uniquely identifying a character, a character position indicating a position of the character in the image, a character size indicating a size of the character, and a character color indicating a color of the character as character information, to the image accepted by the image acceptance unit; a font allocation unit that allocates a font without drawing element as a font corresponding to the character identifier within the character information added by the character information adding unit; and an electronic document generation unit that generates an electronic document for reference to the font information allocated by the font allocation unit, based on the character information added to the image by the character information adding unit.

BRIEF DESCRIPTION OF THE DRAWINGS

Exemplary embodiment of the present invention will be described in detail based on the following figures, wherein.

DETAILED DESCRIPTION

Figure 1:
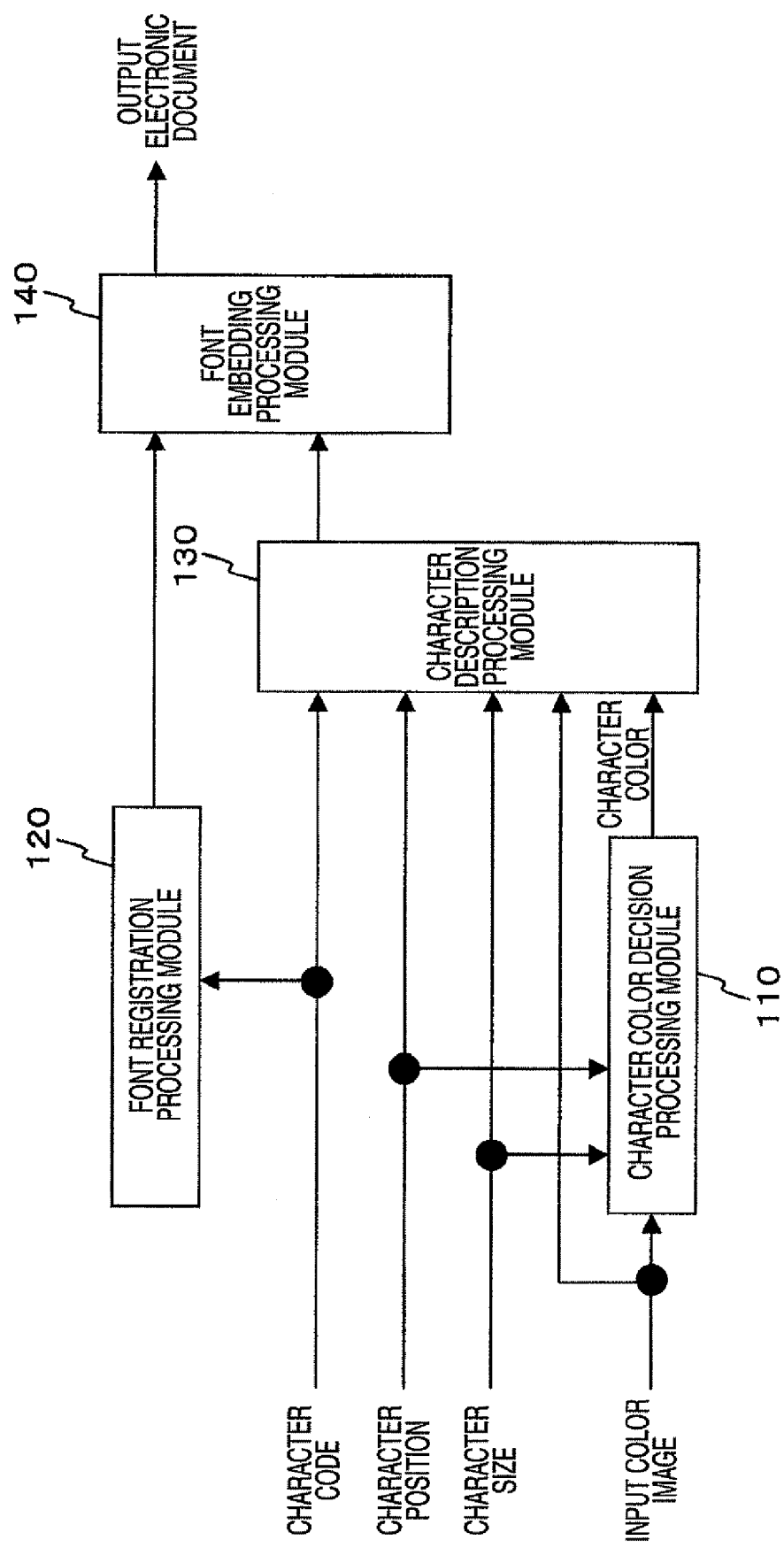
FIG. 1 is a conceptual module block diagram of a configuration example according to a first embodiment.

First of all, a process for copying the character code from an electronic document based on an image using a document format, represented by a PDF, of the electronic document suitable for displaying the print image will be described below.

The electronic document capable of acquiring the text information from the electronic document in the PDF format is limited, as previously described in the section of Background Art. That is, if the electronic document in the PDF format is originally created from the application software having text information using the character code on a word processor or like, the electronic document contains the character code, from which the text information can be acquired.

However, in the case where only the bit map image is contained within the electronic document in the PDF format, the character code is not provided within the electronic document. Therefore, the text information can not be acquired from such electronic document.

Thus, there is a technique for acquiring the character code (text information) from the electronic document by making the character recognition for the character within the bit map image to acquire the character code of character recognition result and contain the character code within the electronic document. With this technique, the character code is acquired by making the character recognition for the character image within the input image. And the character is written as the transparent character to be aligned with the character position of the image, using the acquired character code.

A specific example will be described below, using FIG. 3. An electronic document character code 310 is the result of character recognition within a bit map image 320. The character (electronic document character code 310) obtained by character recognition is superimposed on the bit map image 320 and displayed to conform to the character position and the character size of the bit map image as much as possible with a font corresponding to the character code. This display is made by creating a superposition display character 315 in which the character is of transparent color and superimposing it on the original bit map image 320.

By performing this process, it is possible to create the electronic image from which the character code can be acquired by copy and paste, though it looks like the image at a glance and the electronic document containing no character code.

The character code can be acquired by superimposing and displaying the character of transparent color, irrespective of the bit map image apparently, as previously described.

However, it is not always necessary to prepare the font corresponding to the character code. That is, the displayed character is of transparent color, and simply for the copy purpose, namely, in order that the intended character can be selected, it is required that the character position and character size are adapted to the original image.

Further, since the color information can not be given to the character of transparent color (or it is judged that the color information is transparent color or there is no color information), when the character of transparent color is copied and pasted, the color information of the character can not be acquired from the electronic document. When the character within the bit map image is colored, the text information that can be acquired is monochrome binary text information, though the character is colored. In the monochrome binary text information, the character color is automatically judged as black in most cases.

This embodiment will be outlined below.

In this embodiment, the electronic document is generated having two kinds of character data, involving the character of only visual character shape (character within the image, or the apparent character without character code added) and the character of transparent color (character with the character code added and not visually displayed as the electronic document, but the text information can be copied to another application by copy and paste), in which the font without drawing element as the character is allocated to the character of transparent color. Further, even when the character color is given to the character displayed in transparent color, and the character displayed in transparent color is copied and pasted, the electronic document capable of regenerating the character color on the application of paste object is generated.

A subordinate concept for the outline of this embodiment will be described below.

In this embodiment, the transparent character is realized in the following way.

The transparent character realizes a font without drawing element, namely, a blank font as one example thereof. For example, the character is represented in two colors of black and white. The black is the color representing the shape of character, and the white is the color representing the background. Then, the font representing the blank is all represented in white.

In this embodiment, the transparent character, like the blank, is all represented in white.

The transparent character formed in this manner is registered as the font. In registering the font, the proper character code is given. The proper character code means the character code of character within the image, which can be used in the application of paste object, when copied and pasted. That is, the character code and the font are not in the commonly used relationship, and not necessarily consistent with the character code and the commonly corresponding font. That is, the blank font corresponds to any character code. The electronic document is described using this blank font. Describing the electronic document or character information means generating the contents of the electronic document.

If the electronic document is described using the blank font with the character code to be acquired by copy and paste, the character can be realized as the transparent character that is invisible, because the blank is the same as space. Then, the character color based on the character color within the intrinsic image is given to the character code corresponding to the blank font. Because of the blank character, the character is the transparent character that is invisible, even if the character color is given. However, the character code is given the proper character code.

As a result, if the text information of the blank character is acquired by copy and paste, both the character code corresponding to the blank font and the character color can be acquired. And the blank character is realized as the transparent character that is invisible.

The blank character registered as the font may be prepared for the characters appearing within the electronic document. Or the font registered as the blank character for all the character codes (e.g., all of JIS first level and JIS second level) may be prepared in advance.

These fonts may be embedded into the electronic document, or installed as the system font for use in displaying the electronic document.

The preferred embodiments for carrying out the invention will be described below with reference to the drawings.

FIG. 1 is a conceptual module block diagram of a configuration example according to a first embodiment.

A module generally refers to a part of software (computer program) or hardware and the like that is logically separable. Accordingly, the module in this embodiment is not only the module in the computer program, but also the module in the hardware configuration. Therefore, the embodiment also serves to describe the computer program, system and method. By way of explanation, the terms "store", "stored", and their equivalent wordings are used, but these wordings mean storing or being stored in a storage device, or controlling to store or be stored in the storage device in the embodiment for the computer program. Also, the module corresponds almost one-to-one to the function, but in the implementation, one module may be composed of one program, a plurality of modules may be composed of one program, or conversely one module may be composed of a plurality of programs. Also, a plurality of modules may be executed on one computer, or one module may be executed on a plurality of computers in the distributed or parallel environment. One module may contain another module. In the following, the term "connection" means both the physical connection and the logical connection (for exchange of data, instruction, or reference relationship between data).

Also, the system or apparatus is composed of a plurality of computers, hardware, devices or the like that are connected by communication means such as a network (including one-to-one communication connection), or composed of one computer, hardware or devices. The "apparatus" and "system" are used as synonymous terms.

The character information includes the character code for uniquely identifying the character, the character position indicating the position of the character in the color image of object, the character size indicating the size of the character, and the color of the character. The character information may include one or more of them.

In this embodiment, there are provided a character color decision processing module 110, a font registration processing module 120, a character description processing module 130, and a font embedding processing module 140, as shown in FIG. 1.

First of all, the character code, character position and character size are acquired for every character in the color image of object by performing a character recognition process for the color image of object. The character rectangle size and the character rectangle position may be employed as the character position and character size.

The character recognition process may be arbitrary as far as the character code, character position and character size can be acquired. A number of character recognition processes were described in JP-A-53-10930, JP-A-53-49917, and JP-A-57-189277, for example, although any of the processes may be employed.

As a character cut-out process for acquiring the character position and size, various methods have been proposed. Any of the methods as disclosed in JP-A-5-28301, JP-A-5-120481, JP-A-5-143776, JP-A-5-174185, JP-A-6-44406, JP-A-6-187489, JP-A-6-348911, JP-A-7-13994, JP-A-7-160810, JP-A-8-161432, JP-A-8-297718, JP-A-10-69524, JP-A-10-134145, JP-A-10-261047, JP-A-2000-57261, JP-A-2001-43314 and JP-A-2004-78531, for example, can be employed.

The character color decision processing module 110, which is connected to the character description processing module 130, accepts the color image, character position and character size, and decides the character color as the character information, based on the color of the character of object in the color image. The character color is passed to the character description processing module 130. The character of object is specified by the accepted character position and character size.

The font registration processing module 120, which is connected to the font embedding processing module 140, accepts the character code, allocates the font without drawing element as the font corresponding to the character code within the character information, and passes the font information of allocated result to the font embedding processing module 140. This process for allocating the font to the character code is called a font registration process. The character code of object here is a part of character information added by the character description processing module 130.

The character description processing module 130, which is connected to the character color decision processing module 110 and the font embedding processing module 140, accepts the color image and the character information, and adds the character information to the color image. And the color image with the character information added is passed to the font embedding processing module 140. The character information may be a combination of character code, character position and character size of the character in the color image of object, or may include the character color decided by the character color decision processing module 110.

The font embedding processing module 140, which is connected to the font registration processing module 120 and the character description processing module 130, generates and outputs the electronic document for reference to the font information allocated by the character description processing module 130, based on the character information added to the color image by the character description processing module 130. Also, the font embedding processing module 140 may generate the electronic document by adding the font information allocated by the font registration processing module 120 to the color image with the character information added by the character description processing module 130.

The action and function (operation) of the first embodiment will be described below.

Figure 2:
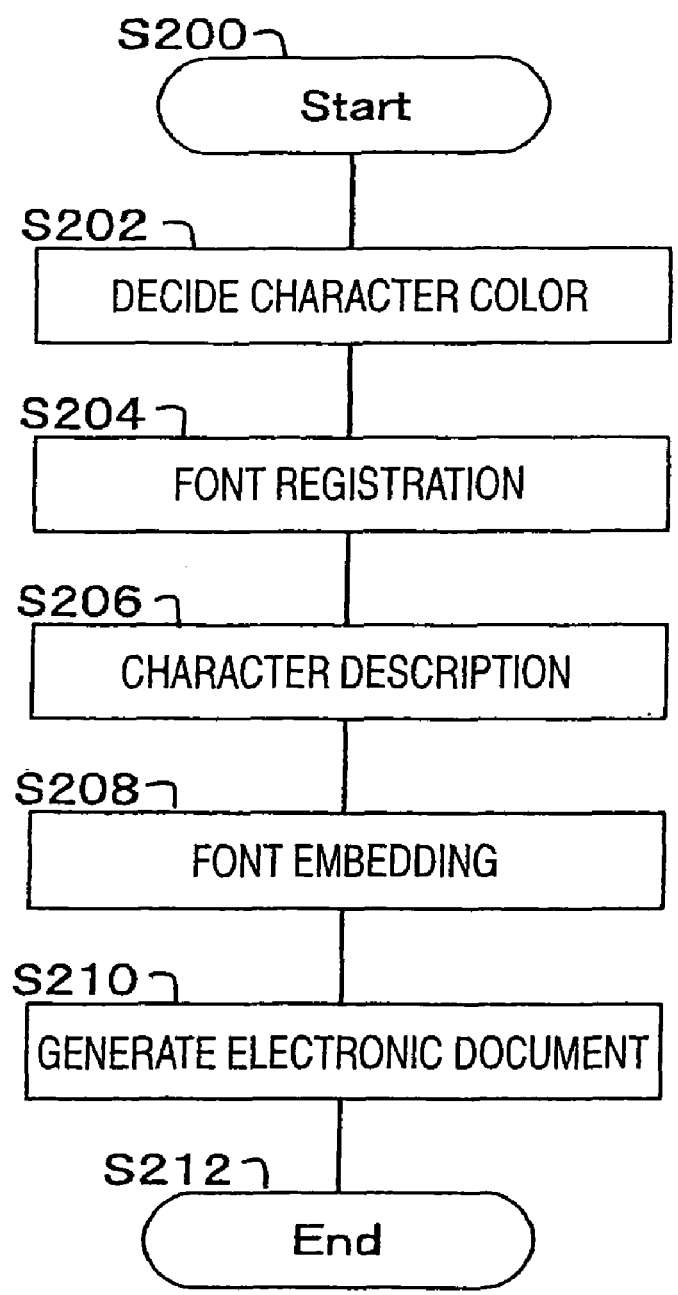
FIG. 2 is a flowchart showing a processing example according to the first embodiment.

FIG. 2 is a flowchart showing a processing example according to the first embodiment.

At step S202, the character color decision processing module 110 decides the character color based on the character color within the color image of object.

At step S204, the font registration processing module 120 registers the font information of blank font for the character code. Any of step S202 and step S204 may be performed ahead. Or they may be performed in parallel.

At step S206, the character description processing module 130 describes the character information of each character.

At step S208, the font embedding processing module 140 performs a font information embedding process using the processing results at step S204 and step S206.

At step S210, the font embedding processing module 140 generates and outputs the electronic document using the color image, character information and font information.

The character position, character size and the color image of object are inputted into the character color decision processing module 110. The character color decision processing module 110 decides the character color of the character at the inputted position. As the character colors, the values of three primary colors of R, G and B are acquired. The acquired color space may be arbitrary.

The character color decision processing module 110 may perform a process for acquiring the average color other than the background color within the inputted character rectangle, for example. Another example of the character color acquisition process will be described later using FIG. 8 and the like.

The font of the accepted character code is registered by the font registration processing module 120.

The font as used herein means the data that can output the character shape if the character code is inputted.

In this embodiment, the font is registered in the following manner.

First of all, the input character code is registered. As the character shape corresponding to the character code, the shape of all background color (i.e., OFF color as the character shape) is registered. In other words, the same character shape as the blank character is registered. More specifically, the white pixel of 1×1 pixel is registered as the character shape. The number of pixels may be 1×1, or any other size. The number of pixels of 1×1 has the highest efficiency.

Then, the character description processing module 130 describes the following character information. If there are four pieces of information, including the character position, character size, font (that is font registered by the font registration processing module 120) and character color corresponding to the character code, the color character existing in the color image of object can be regenerated.

Finally, the font embedding processing module 140 adds the font subjected to the font registration process by the font registration processing module 120 to the description result of character information by the character description processing module 130 and outputs the electronic document.

Though the description of character information is mainly described above, the electronic document for output actually includes the color image of object.

That is, if the electronic document for output is displayed, the color image of object is displayed as the background image, and further the character using the blank character is displayed thereon. The background image may directly use the color image of object, or use the image into which the color image of object is converted through any other process. Various conversion methods for the color image of object will be described below using FIG. 6.

The font information is not necessarily embedded into the electronic document. It may be held separately from the electronic document. Or it may be installed in the system (operating system) In this case, the application for displaying the electronic document displays the electronic document, using the font information held separately from the electronic document or the font information installed in the system.

Figure 4:
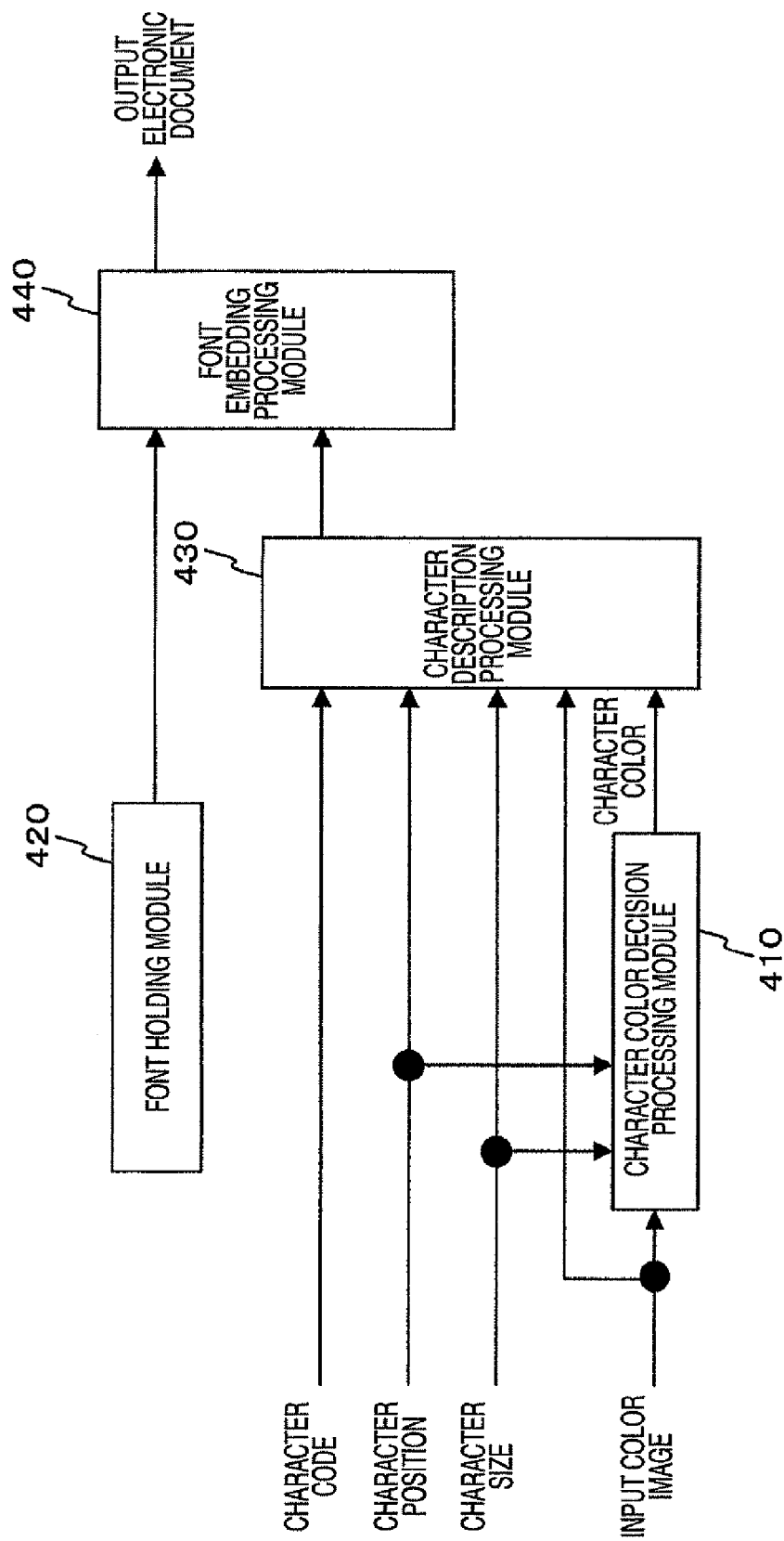
FIG. 4 is a conceptual module block diagram of a configuration example according to a second embodiment.

FIG. 4 is a conceptual module block diagram of a configuration example according to a second embodiment.

In this embodiment, there are provided a character color decision processing module 410, a font holding module 420, a character description processing module 430, and a font embedding processing module 440, as shown in FIG. 4.

The color image of object to be accepted, character code, character position and character size are the same as in the first embodiment. Also, the character color decision processing module 410 is equivalent to the character color decision processing module 110, the character description processing module 430 is equivalent to the character description processing module 130, and the font embedding processing module 440 is equivalent to the font embedding processing module 140.

That is, the second embodiment is different from the first embodiment in that the font holding module 420 is used instead of the font registration processing module 120. The font holding module 420 will be mainly described below.

The font holding module 420, which is connected to the font embedding processing module 440, stores the font information in which the font without drawing element is allocated to the character code, and is accessed from the font embedding processing module 440.

In the second embodiment, the font may not be registered for each input color image. That is, the font including all the character codes considered to appear may be prepared in advance. That is, the font in which the character shape corresponding to all the character codes is blank character is prepared in the font holding module 420. The character set may correspond to each language. In the English sphere, the font in which all the character codes are blank character is prepared corresponding to the character code set capable of supporting the ASCII code. In Japanese, the font in which the character shape is blank character is prepared corresponding to all the character codes at JIS first level and second level. Or the font in which the character shape is blank character is prepared corresponding to all UNICODE.

In this manner, even if the font is prepared in advance in the font holding module 420, the file capacity per blank character is small. That is, since the data amount indicating the shape of each character is very small, there is less load on the file size of electronic document after embedding the font or the storage capacity of the font holding module 420.

The action and function (operation) of the second embodiment will be described below.

Figure 5:
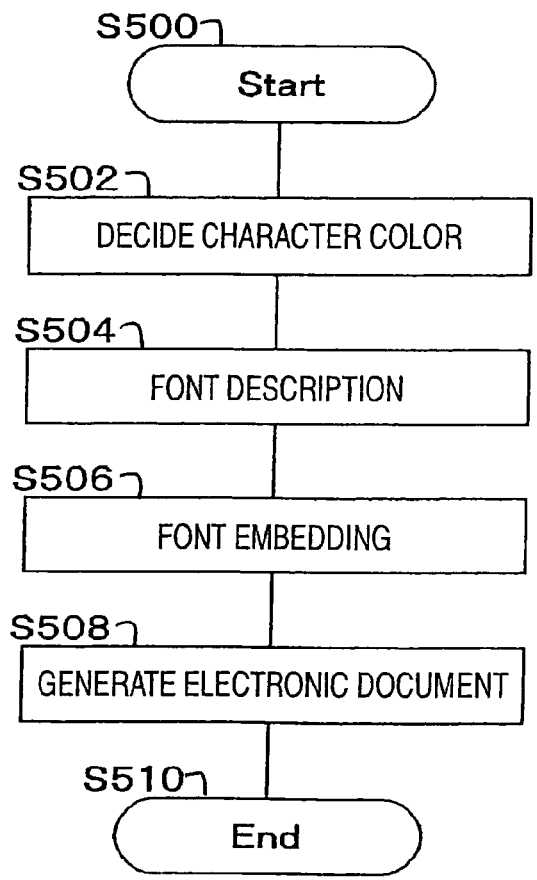
FIG. 5 is a flowchart showing a processing example according to the second embodiment.

FIG. 5 is a flowchart showing a processing example according to the second embodiment.

At step S502, the character color decision processing module 410 decides the character color based on the character color in the color image of object.

At step S504, the character description processing module 430 describes the character information of each character.

At step S506, the font embedding processing module 440 performs a font information embedding process using the processing result at step S504 and the font holding module 420.

At step S508, the font embedding processing module 440 generates and outputs the electronic document using the color image, character information and font information.

In the second embodiment, the font information may not be necessarily embedded into the electronic document as in the first embodiment. It may be held separately from the electronic document. Or it may be installed in the system (operating system). In this case, the application that displays the electronic document displays the electronic document using the font information held separately from the electronic document or the font information installed in the system.

<Process for Background Image in the Font Embedding Processing Module 140, 440>

Figure 3:
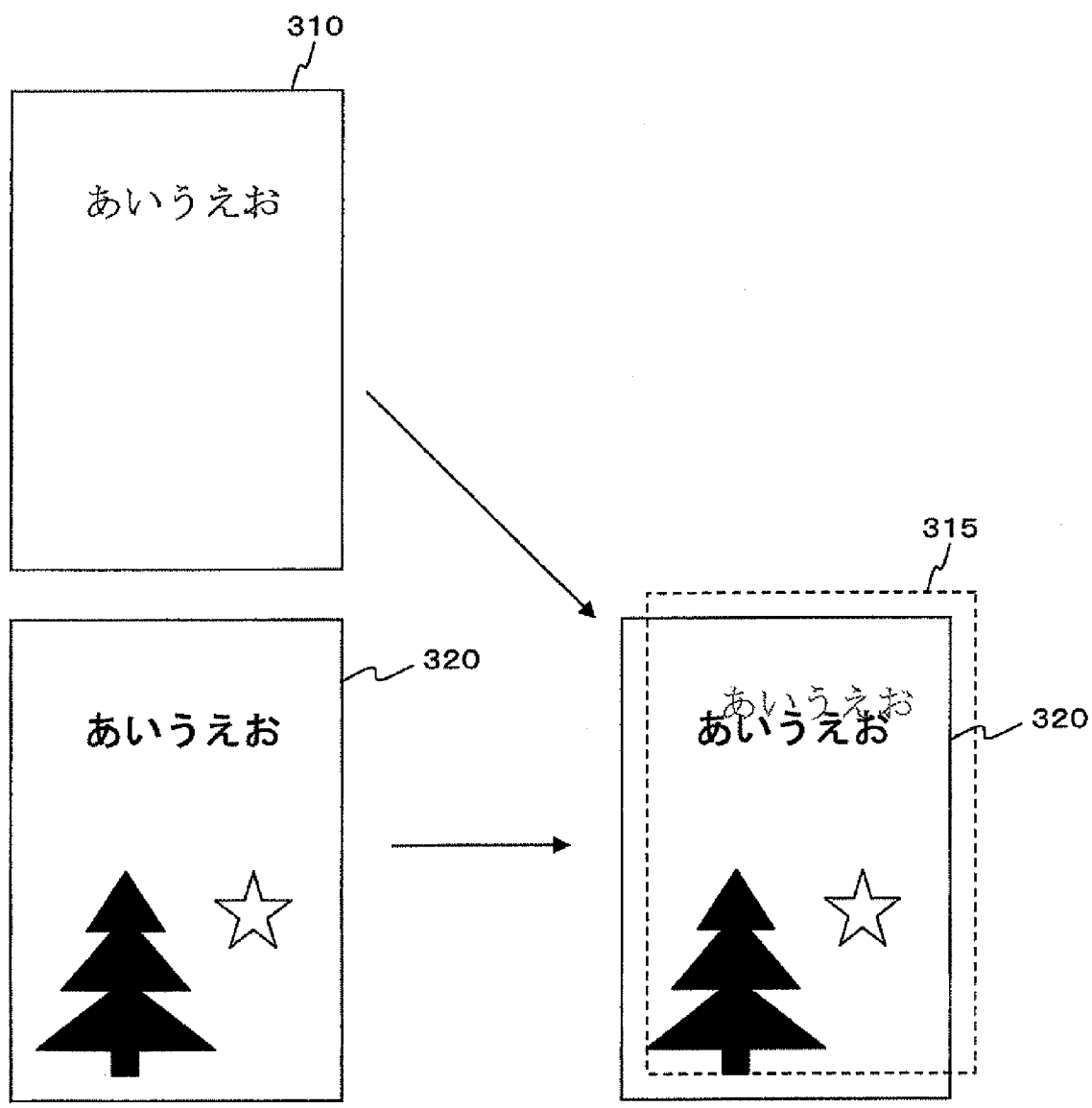
FIG. 3 is an explanatory view showing an example of a scheme for acquiring the character code from the electronic document based on the image.

Though in the previous embodiments, the color image of object is directly employed as the background image (e.g., bit map image 320 as shown in FIG. 3) of the electronic document to be generated, another form may be taken.

<1>

As a method for attaining a higher image compression ratio than the conventional JPEG compression, there is an image format of multilayer structure as described in JP-A-2000-196893 and JP-A-2005-228331, for example, in which this image format may be employed for the background image.

To avoid a phenomenon in which a JPEG image distortion mainly occurs in the edge part of the image having very high frequency component power, they adopt a policy of decomposing the input image into a character/line-work part having very high frequency component power and a background part excluding the character/line-work part, and compressing the background part at a high compression ratio in JPEG and the character/line-work part in reversible encoding.

Among others, a technique as described in JP-A-2000-196893 takes a three layer method.

Figure 6:
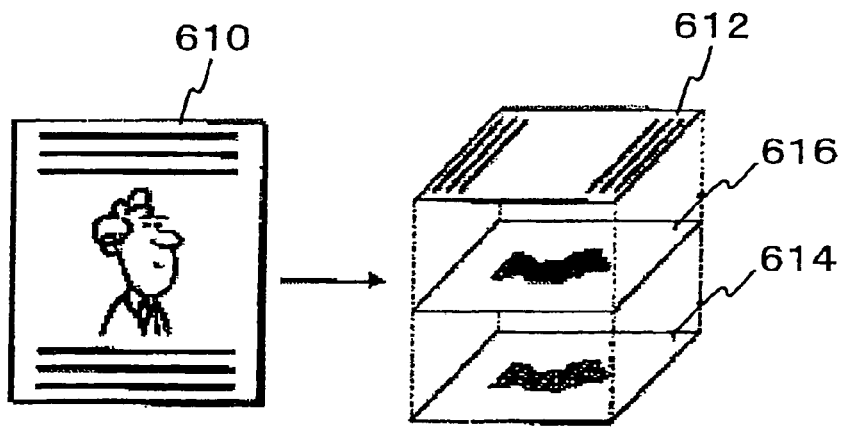
FIG. 6 is an explanatory view showing a process for the background image.

An image 610 is divided into a pictorial pattern part 614 and a character/line-work part 612, as shown in FIG. 6. Further, as the final output image, select information 616 on which of the pictorial pattern part 614 or the character/line-work part 612 to select is held. The image is represented using this three layer data.

Herein, the select information 616 can record the character shape in the form of binary image. Also, the character/line-work part 612 that is foreground image can record the character color. In this manner, when the select information 616 represents the inside of character, the character color can be represented by the character/line-work part 612 that is foreground image.

Figure 7:
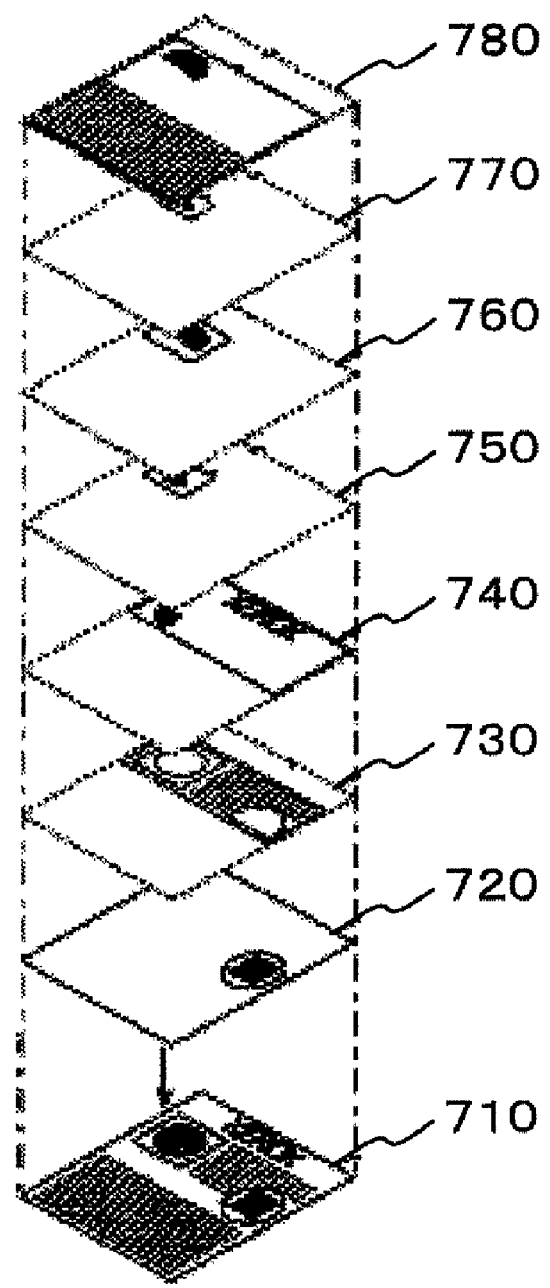
FIG. 7 is an explanatory view showing a process for the background image.

Also, a technique as described in JP-A-2005-228331 handles the structure having one layer of the many-valued image in the background image (background image 710) and the N layers of the binary images (binary images 720 to 780), which are compressed by different compression methods, in an example as shown in FIG. 7. This structure is one in which the binary images having color information are superimposed on the many-valued JPEG image as the background image.

In the example as shown in FIG. 7, the background image 710 on the bottom layer is compressed in a many-valued image format by the JPEG or the like. The other layers (binary images 720 to 780) are compressed by a binary image encoding method. Since the color information is added to the image on each binary image encoded layer, the image is decoded by adding the color in decoding.

<2>

With the techniques as described in JP-A-2000-196893 and JP-A-2005-228331, the binary image is directly compressed as bit map information by a binary image encoding method (MMR, JBIG or the like).

In another form, the binary image may be outlined.

The outlining is a method of approximating the contour shape of the character (or the image that can be represented in binary information, besides the character) with a Bezier curve.

As an example of this method, a technique as described in JP-A-2006-253892 can be given. The outlining method is not limited to this, but may be any other technique.

<Process in Another Form in the Character Color Decision Processing Module 110, 410>

<1>

In the character color decision processing module 110, 410 in the previous embodiments, the average color except for the background color within the character rectangle is the character color.

Moreover, the character part within the character rectangle may be extracted to make the average color of that part the character color. Various methods for extracting the character part are provided. The techniques as described in JP-A-2000-196893 and JP-A-2005-228331, for example, may be employed.

<2>

The character color decision processing modules 110 and 410 may not acquire the character color for each character.

The color image of object is separated into N-color layers to make each color the character color.

Figure 8:
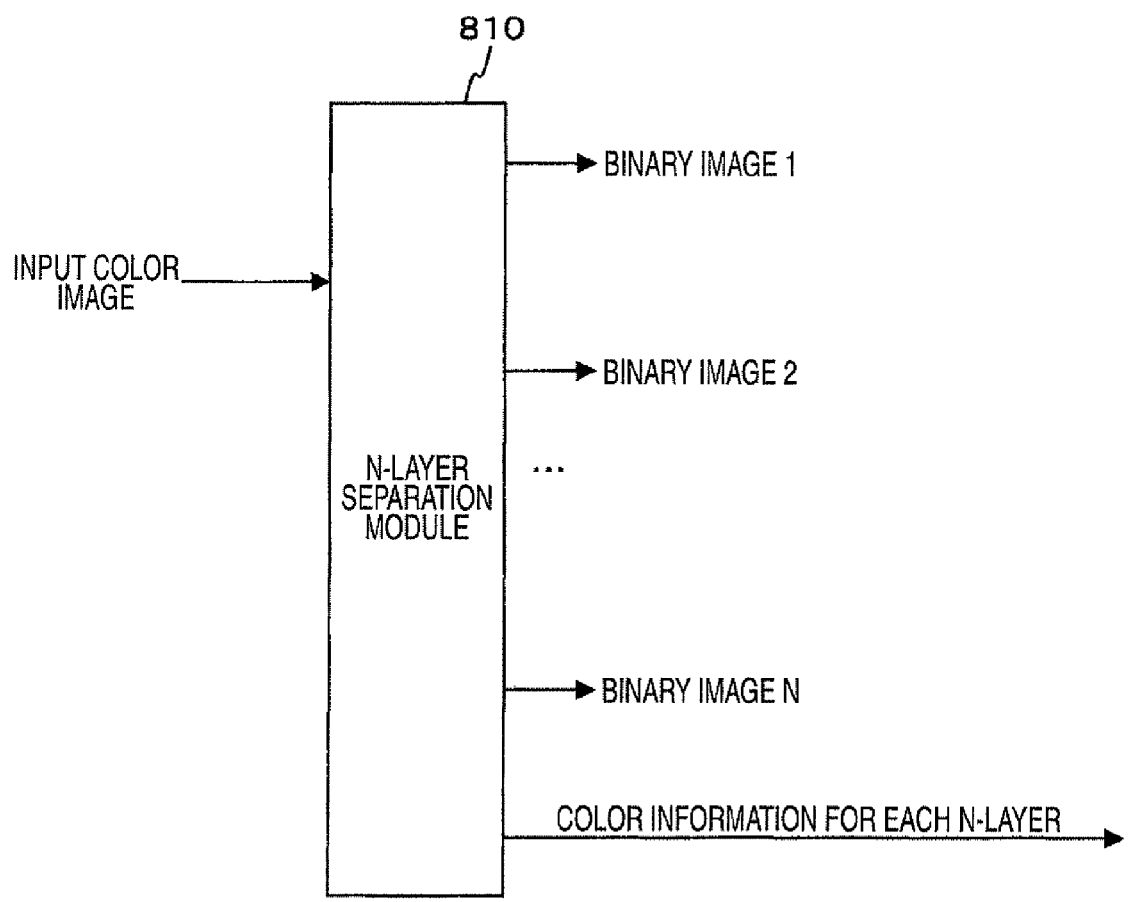
FIG. 8 is an explanatory view showing an N-layer separation module within the character color decision processing module.

That is, the character color decision processing modules 110 and 410 may contain an N-layer separation module 810 in an example as shown in FIG. 8. The N-layer separation module 810 accepts the color image of object and outputs N sheets of binary images. A process with the N-layer separation module 810 may use a technique as described in JP-A-2005-228331, for example. Further, each color of the N layers is decided by the N-layer separation module 810.

The character color decision processing modules 110 and 410 detect on which layer the character exists, using the accepted character size and character position. And the color on the layer with the largest number of pixels within the character rectangle of each character is employed as the character color.

Also, the N sheets of binary images may be defined with the pixel of character as ON and the pixel of non-character as OFF, and an OR (sum) image for N sheets of images may be generated and the character code, character position and character size may be acquired by making the character recognition for the OR image.

<3>

The select information as described in JP-A-2000-196893 may be employed.

For example, the information of extracting the character part can be acquired as the select information. A select information acquisition method involves extracting the edge part of an input image using a high-pass filter and forming a closed area using the edge part to make the inside of the closed area the character part.

Herein, the select information (binary information) may be defined with the pixel of character as ON and the pixel of non-character as OFF, and the character code, character position and character size may be acquired by making the character recognition for the binary information.

Further, the character color is acquired from the color image of object, based on the character position, character size and select information.

Figure 9:
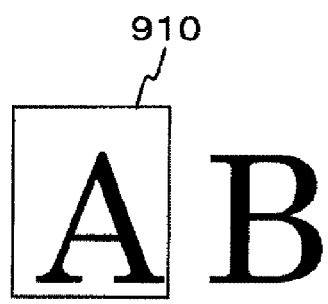
FIG. 9 is an explanatory view showing another processing example within the character color decision processing module.

That is, the pixel position of select information of ON that exists within a character rectangle 910 is obtained in an example as shown in FIG. 9. The color value at the pixel position is obtained from the color image of object. Further, the average color (or median color, mode color, etc.) of the color values is decided as the character color. Thereby, since the character is not composed of one color, it is possible to treat the case where the character is composed of multiple colors.

And a method for acquiring the select information may use the techniques as described in JP-A-2005-39771, JP-A-2005-63445, JP-A-2005-175641, JP-A-2005-184402 and JP-A-2005-184404.

Further, though the average value at the black pixel positions of character "A" is simply acquired as shown in FIG. 9, as previously described, there is a fear that the color may be changed (the color may become different from the character color within the color image of object), because it is not assured that a method for forming the select information of character "A" is exactly matched with the edge of character. In this case, the character color may be acquired near the center of character. For this purpose, the character shape may be degenerated to acquire the average value thereof. A degeneration method can be performed, for example, by converting the distance and decrementing from 1. A method for converting the distance is described in Toshiya Minami, "Image engineering", first edition, Corona-sha, from 96 page to 103 page.

<Other Forms of Font>

The form of font for acquiring the character shape from the character code was presented in the previous embodiments.

Besides, for example, when the character shape is acquired from the character code, a parametric number may be used.

As such parametric number, a CID key designation font, for example, may be employed. That is, the font shape is designated by the number called a CID. Further, a code conversion module for inputting the character code and outputting the CID is prepared separately to associate the character code with the CID.

Or a CID conversion module for inputting the CID and outputting the character code may be prepared to make the same operation.

<Other Forms>

Though all the characters having the character code are the blank font in the previous embodiments, all the characters may not be necessarily the blank font. The font may be registered with a part of the characters in the proper shape (any other shape than the blank font).

Though the character code, font, character size and character position are described for each character in the previous embodiments, they may not be described again in some cases, depending on the specifications of electronic document, if the character has the character information equivalent to the preceding character. That is, in this case, they may be described, when changed. Also, other compression methods may be employed.

Also, the forms of the previous embodiments may be combined.

Though the color image is the object in the previous embodiments, the many-valued image and the binary image may be treated, in addition to the color image. It is required that the image contains the character image. If the binary image is the object, the character color decision processing modules 110 and 410 may always output the black as the character color.

Figure 10:
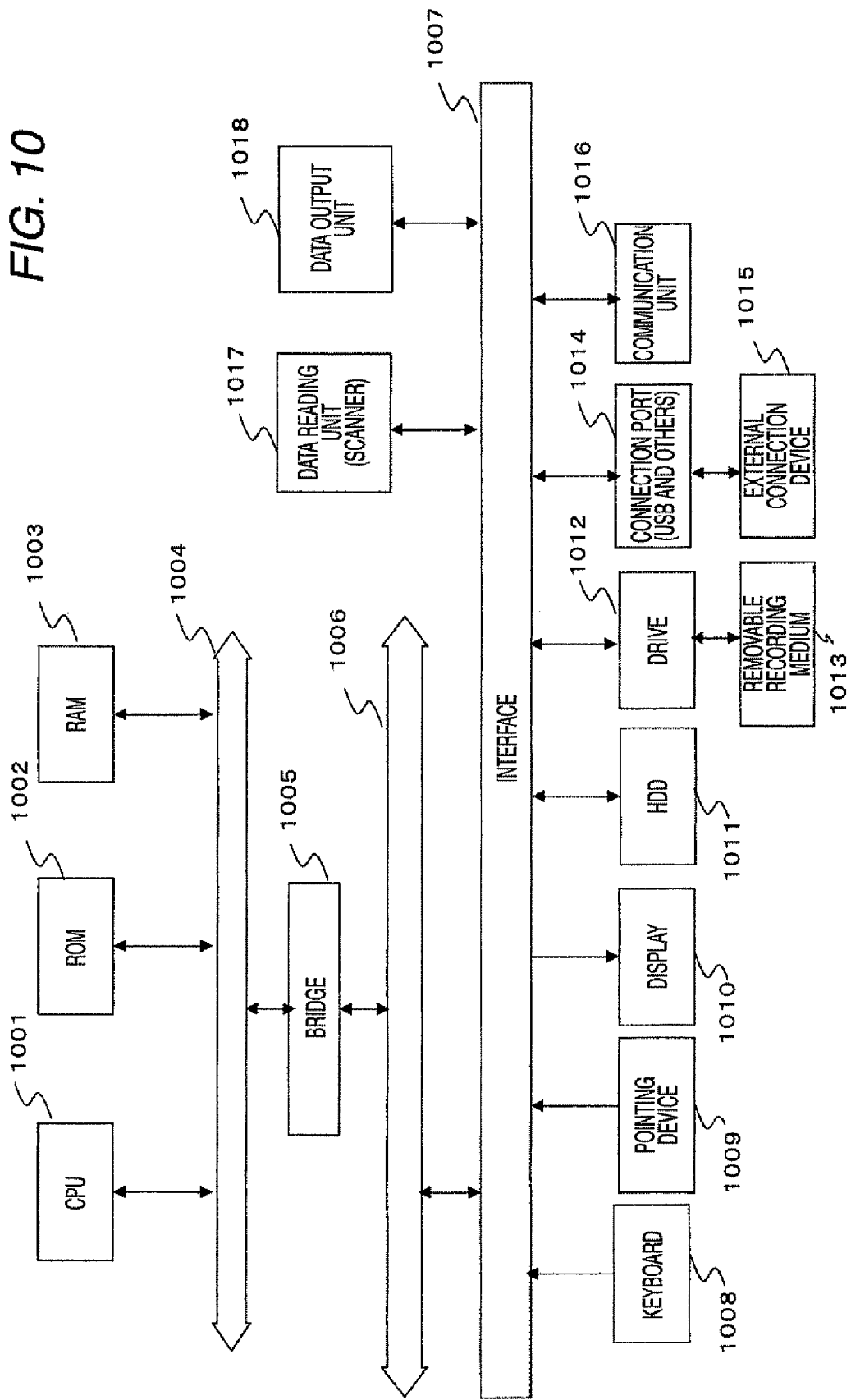
FIG. 10 is a block diagram showing a hardware configuration example of the computer that implements the first and second embodiments.

Referring to FIG. 10, a hardware configuration example in the previous embodiments will be described below. The hardware configuration example as shown in FIG. 10 is composed of a personal computer (PC), for example, and has a data reading unit 1017 such as a scanner and a data output unit 1018 such as a printer.

A CPU (Central Processing Unit) 1001 is a control part for performing the process in accordance with a computer program describing an execution sequence of various kinds of modules as described in the previous embodiments, namely, the character color decision processing module 110, the font registration processing module 120, the character description processing module 130 and the font embedding processing module 140.

A ROM (Read Only Memory) 1002 stores a program and the operation parameters for use in the CPU 1001. A RAM (Random Access Memory) 1003 stores a program for use in execution of the CPU 1001, and the parameters properly changing during the execution. They are connected to each other via a host bus 1004 composed of a CPU bus.

The host bus 1004 is connected via a bridge 1005 to an external bus 1006 such as a PCI (Peripheral Component Interconnect/Interface) bus.

A keyboard 1008 and a pointing device 1009 such as a mouse are input devices operated by the operator. A display 1010 is composed of a liquid crystal display unit or a CRT (Cathode Ray Tube) that displays various kinds of information as text or image information.

An HDD (Hard Disk Drive) 1011 contains a hard disk and drives the hard disk to record or regenerate a program or information to be performed by the CPU 1001. The hard disk stores the color image of object and the font. Moreover, it stores other various data processing programs and various computer programs.

A drive 1012 reads data or a program recorded on a removable recording medium 1013 such as a magnetic disk, an optical disk, a magneto-optical disk or a semiconductor memory mounted, and supplies the data or program to the RAM 1003 connected via an interface 1007, the external bus 1006, the bridge 1005 and the host bus 1004. The removable recording medium 1013 is usable as a data recording area in the same way as the hard disk.

A connection port 1014 connects an external connection device 1015, and has a connection portion such as a USB or IEEE 1394. The connection port 1014 is connected via the interface 1007, the external bus 1006, the bridge 1005 and the host bus 1004 to the CPU 1001. A communication unit 1016 is connected to the network and performs a data communication process with the outside. The data reading unit 1017 is a scanner, for example, and performs a document reading process. The data output unit 1018 is a printer, for example, and performs an output process for document data.

The hardware configuration as shown in FIG. 10 is one configuration example, and the previous embodiments are not limited to the configuration as shown in FIG. 10, but may be any configuration that can perform the modules as described in the previous embodiments. For example, some modules may be composed of the dedicated hardware (e.g., Application Specific Integrated Circuit: ASIC), some modules may reside in an external system, connected via the communication liner or a plurality of systems as shown in FIG. 10 may be connected to each other via the communication line to operate in cooperation with each other. Also it may be incorporated into a copying machine, a facsimile, a scanner, a printer, or a multi-function device (image processing device having two or more functions of scanner, printer, copier and facsimile).

The program as described above may be provided by storing it in the recording medium, or by distributing it via the communication means. In this case, for example, the program as described above may be grasped as the invention of a "computer readable recording medium recording the program".

The "computer readable recording medium recording the program" means the recording medium on which the program is recorded that can be read on the computer, used for installing, executing or circulating the program.

Examples of the recording medium may include a digital versatile disk (DVD), for example, "DVD-R, DVD-RW, DVD-RAM" that are the standards settled by the DVD forum or "DVD+R, DVD+RW and the like" that are the standards settled by the DVD+RW, compact disk (CD), read only memory (CD-ROM), CD recordable (CD-R), CD rewritable (CD-RW), magneto-optical disk (MO), flexible disk (FD), magnetic tape, hard disk, read only memory (ROM), electrically erasable and programmable read only memory (EEPROM), flash memory, and random access memory (RAM) and the like.

And all or a part of the program may be recorded in the recording medium, and retained or circulated. Also, it may be transmitted through the communication, using the transmission media such as a wire network or a wireless network for use in a local area network (LAN), metropolitan area network (MAN), wide area network (WAN), internet, intranet, or extranet, or a combination thereof, or carried over the carrier wave.

Moreover, the program as previously described may be a part of another program, or recorded in the recording medium, together with a distinct program. The program may be recorded in a plurality of recording media by dividing it. Also, it may be recorded in any form, compressed or encoded, as far as recoverable.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
an image acceptance unit that accepts an image;
a character information adding unit that adds, via a processor, character information to the image accepted by the image acceptance unit, including: (i) a character code for uniquely identifying a character, (ii) a character position indicating a position of the character in the image, (iii) a character size indicating a size of the character, and (iv) a character color indicating a color of the character;
a font allocation unit that allocates font information without a drawing element as a font corresponding to the character code within the character information added by the character information adding unit; and
an electronic document generation unit that generates an electronic document for reference to the font information allocated by the font allocation unit, based on the character information added to the image by the character information adding unit, wherein
when text information of the character information of the electronic document is copied and pasted, the character code and the character color are acquired, and
the font information is added to the image as transparent characters that contain at least one of the font information, the character code and the character color.

2. The image processing apparatus as claimed in claim 1, wherein
the electronic document generation unit generates the electronic document by adding the font information allocated by the font allocation unit to the image with the character information added by the character information adding unit.

3. The image processing apparatus as claimed in claim 1, wherein
the image accepted by the image acceptance unit is a color image,
the apparatus further comprises a character color decision unit that decides the color of the character as the character information, based on the color of the character in the color image accepted by the image acceptance unit, and the character information adding unit adds the character color decided by the character color decision unit as the character information.

4. An image processing apparatus comprising:

an image acceptance unit that accepts an image;

a character information adding unit that adds, via a processor, character information to the image accepted by the image acceptance unit, including: (i) a character code for uniquely identifying a character, (ii) a character position indicating a position of the character in the image, (iii) a character size indicating a size of the character, and (iv) a character color indicating a color of the character;

a font information storage that stores font information in which a font without drawing element is allocated to the character code; and an electronic document generation unit that generates an electronic document for reference to the font information stored by the font information storage, based on the character information added to the image by the character information adding unit, wherein when text information of the character information of the electronic document is copied and pasted, the character code and the character color are acquired, and the font information is added to the image as transparent characters that contain at least one of the font information, the character code and the character color.

5. The image processing apparatus as claimed in claim 4, wherein the electronic document generation unit generates the electronic document by adding the font information stored by the font information storage to the image with the character information added by the character information adding unit.

6. A non-transitory computer readable medium storing a program causing a computer to execute a process for performing an image processing, the process comprising:

accepting an image;

adding character information to the accepted image, including: (i) a character code for uniquely identifying a character, (ii) a character position indicating a position of the character in the image, (iii) a character size indicating a size of the character, and (iv) a character color indicating a color of the character;

allocating font information without a drawing element as the font corresponding to the character code within the added character information; and generating an electronic document for reference to the allocated font information, based on the character information added to the image, wherein when text information of the character information of the electronic document is copied and pasted, the character code and the character color are acquired, and the font information is added to the image as transparent characters that contain at least one of the font information, the character code and the character color.

7. A non-transitory computer readable medium storing a program causing a computer to execute a process for performing an image processing, the process comprising:

accepting an image;

adding character information to the accepted image, including: (i) a character code for uniquely identifying the character, (ii) a character position indicating a position of the character in the image, (iii) a character size indicating a size of the character, and (iv) a character color indicating a color of the character;

storing font information in which a font without drawing element is allocated to the character code; and generating an electronic document for reference to the stored font information, based on the character information added to the image, wherein when text information of the character information of the electronic document is copied and pasted, the character code and the character color are acquired, and the font information is added to the image as transparent characters that contain at least one of the font information, the character code and the character color.

* * * * *